US012276935B2

(12) United States Patent
Shiomi

(10) Patent No.: US 12,276,935 B2
(45) Date of Patent: Apr. 15, 2025

(54) DEVELOPING DEVICE

(71) Applicant: CANON KABUSHIKI KAISHA, Tokyo (JP)

(72) Inventor: Tomohiro Shiomi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/522,700

(22) Filed: Nov. 29, 2023

(65) Prior Publication Data

US 2024/0192634 A1 Jun. 13, 2024

(30) Foreign Application Priority Data

Dec. 7, 2022 (JP) ................................ 2022-195667

(51) Int. Cl.
*G03G 21/18* (2006.01)
*G03G 15/00* (2006.01)
(Continued)

(52) U.S. Cl.
CPC ..... *G03G 21/1825* (2013.01); *G03G 15/0121* (2013.01); *G03G 15/0865* (2013.01); *G03G 15/0896* (2013.01); *G03G 15/5025* (2013.01); *G03G 21/1647* (2013.01); *G03G 21/1652* (2013.01); *G03G 21/1661* (2013.01); *G03G 21/1676* (2013.01); *G03G 21/1803* (2013.01);
(Continued)

(58) Field of Classification Search
CPC ........... G03G 15/0121; G03G 15/0865; G03G 15/0896; G03G 15/5025; G03G 21/1647; G03G 21/1652; G03G 21/1661; G03G 21/1676; G03G 21/1803; G03G 21/1814; G03G 21/1817; G03G 21/1821; G03G 21/1825; G03G 21/1839; G03G 21/1842
See application file for complete search history.

(56) References Cited

U.S. PATENT DOCUMENTS 9,026,002 B2 5/2015 Sato et al.
9,335,725 B2 5/2016 Sato et al.
(Continued)

FOREIGN PATENT DOCUMENTS

JP 2012-058627 A 3/2012
JP 2013-182036 A 9/2013
(Continued)

*Primary Examiner* — Joseph S Wong
(74) *Attorney, Agent, or Firm* — VENABLE LLP

(57) ABSTRACT

A developing device mountable on an image forming apparatus includes a main body, a fixing portion, a connecting portion and a developing side electric contact. The fixing portion is fixed to the image forming apparatus in a state where the main body and the fixing portion are positioned in the image forming apparatus. A developing side electric contact is provided on the fixing portion and to contact a main assembly side electric contact of the image forming apparatus in a state in which the main body and the fixing portion are positioned. When the developing device is pressed by a pressing portion of the image forming apparatus in a state where the fixing portion is fixed to the image forming apparatus, the main body is rotated about the connecting portion as a rotation center so that the developer carrying member is moved from a separated position to a developing position.

8 Claims, 11 Drawing Sheets

(51) Int. Cl.

| | |
|---|---|
| ***G03G 15/01*** | (2006.01) |
| ***G03G 15/08*** | (2006.01) |
| ***G03G 21/16*** | (2006.01) |

(52) U.S. Cl.
CPC ..... *G03G 21/1814* (2013.01); *G03G 21/1817* (2013.01); *G03G 21/1821* (2013.01); *G03G 21/1839* (2013.01); *G03G 21/1842* (2013.01)

(56) References Cited

U.S. PATENT DOCUMENTS

| | | | | |
|---|---|---|---|---|
| 11,016,440 | B2 | 5/2021 | Kawamura et al. | |
| 2006/0024080 | A1* | 2/2006 | Chadani ............. | G03G 21/1825 399/90 |
| 2021/0216037 | A1* | 7/2021 | Dai ..................... | G03G 21/1842 |
| 2023/0418182 | A1* | 12/2023 | Fukasawa .......... | G03G 15/0863 |

FOREIGN PATENT DOCUMENTS

| | | | |
|---|---|---|---|
| JP | 2017-173805 | A | 9/2017 |
| JP | 2020-144191 | A | 9/2020 |
| JP | 2022-093491 | A | 6/2022 |
| JP | 2022-102014 | A | 7/2022 |

* cited by examiner (a)

(b)

DEVELOPING DEVICE

FIELD OF THE INVENTION AND RELATED ART

The present invention relates to a developing device which develops an electrostatic latent image which is formed on an image bearing member by a developer.

In an image forming apparatus, a configuration, that the developing device is dismountable from a main assembly of the image forming apparatus for ease of maintenance and replacement, is known. The developing device is movable to a position in which a developer carrying member such as a developing roller is separated from a photosensitive drum so that it does not contact an image bearing member such as the photosensitive drum in the main assembly of the image forming apparatus when it is mounted on or dismounted from the main assembly of the image forming device.

For example, in a developing device according to Japanese Laid-Open Patent Application (JP-A) No. 2012-58627, it is swingable accessibly and separably around a shaft with respect to a photosensitive member unit, while it is mounted in a normal mounting position of a main body of an assembly. In addition, while a bridge member which bridges an opening portion in a front side frame of the main body of the assembly vertically is attached to a front side frame of the developing device, a front side end portion of the shaft is rotatably supported by a bearing which is provided in the bridge member. Further, in JP-A No. 2012-58627, it is described that a configuration in which the developing device in a state that the bridge member is assembled is inserted into the main body of the assembly and the bridge member is attached to the front side frame of the main body of the assembly may be used.

Here, the developing device is generally provided with electric parts such as a toner density sensor. An electrical connection configuration such as a connector is provided with the developing device and the main assembly of the image forming apparatus in order to perform communication between the electric parts and the main assembly of the image forming apparatus. However, the electrical connection configuration which uses the connector has chronic problems such as a possibility of bending a pin in the connector when connecting and a connection failure due to half insertion. Therefore, when the developing device is replaced by a user who is not familiar with handling of the image forming apparatus, the problems may become more apparent.

On the other hand, the electrical connection configuration is possible to be an electrical contact method. The electrical contact method is a configuration in which the electrical connection is secured by contact pressure between contact points of each other. The contact pressure is applied as a reaction force to a part or to a device itself which includes the contact points. Therefore, when the reaction force is not handled properly, it may cause deformation such as bending or twisting of the device itself. In particular, the developing device is required to have an appropriate positional relationship between the photosensitive drum and the developing roller while it is mounted on the main assembly of the image forming apparatus, however, it is not possible to set the positional relationship to be appropriate in a case that a main body of the developing device which includes a developing container which holds the developing roller, etc. is deformed, for example.

SUMMARY OF THE INVENTION

A principal object of the present invention is to improve workability when mounting a developing device on an image forming apparatus.

Another object of the present invention is to provide a developing device mountable on an image forming apparatus, the developing device comprising: a main body portion including a developing container configured to accommodate a developer containing toner and a carrier, and a developer carrying member configured to carry and feed the developer to a developing position where an electrostatic image formed on an image bearing member is developed; a fixing portion fixed to the image forming apparatus to mount the developing device on the image forming apparatus in a state in which the main body portion is positioned in the image forming apparatus and the fixing portion is positioned in the image forming apparatus; a connecting portion configured to connect the main body portion and the fixing portion; and a developing side electric contact portion provided on the fixing portion and configured to contact a main assembly side electric contact portion of the image forming apparatus in a state in which the main body portion is positioned in the image forming apparatus and the fixing portion is positioned in the image forming apparatus, wherein in a case where the developing device is pressed by a pressing portion of the image forming apparatus in a state in which the fixing portion is fixed to the image forming apparatus, the main body portion is rotated about the connecting portion as a rotation center so that the developer carrying member is moved from a separated position separated from the developing position to the developing position.

Further features of the present invention will become apparent from the following description of exemplary embodiments with reference to the attached drawings.

Figure 4:
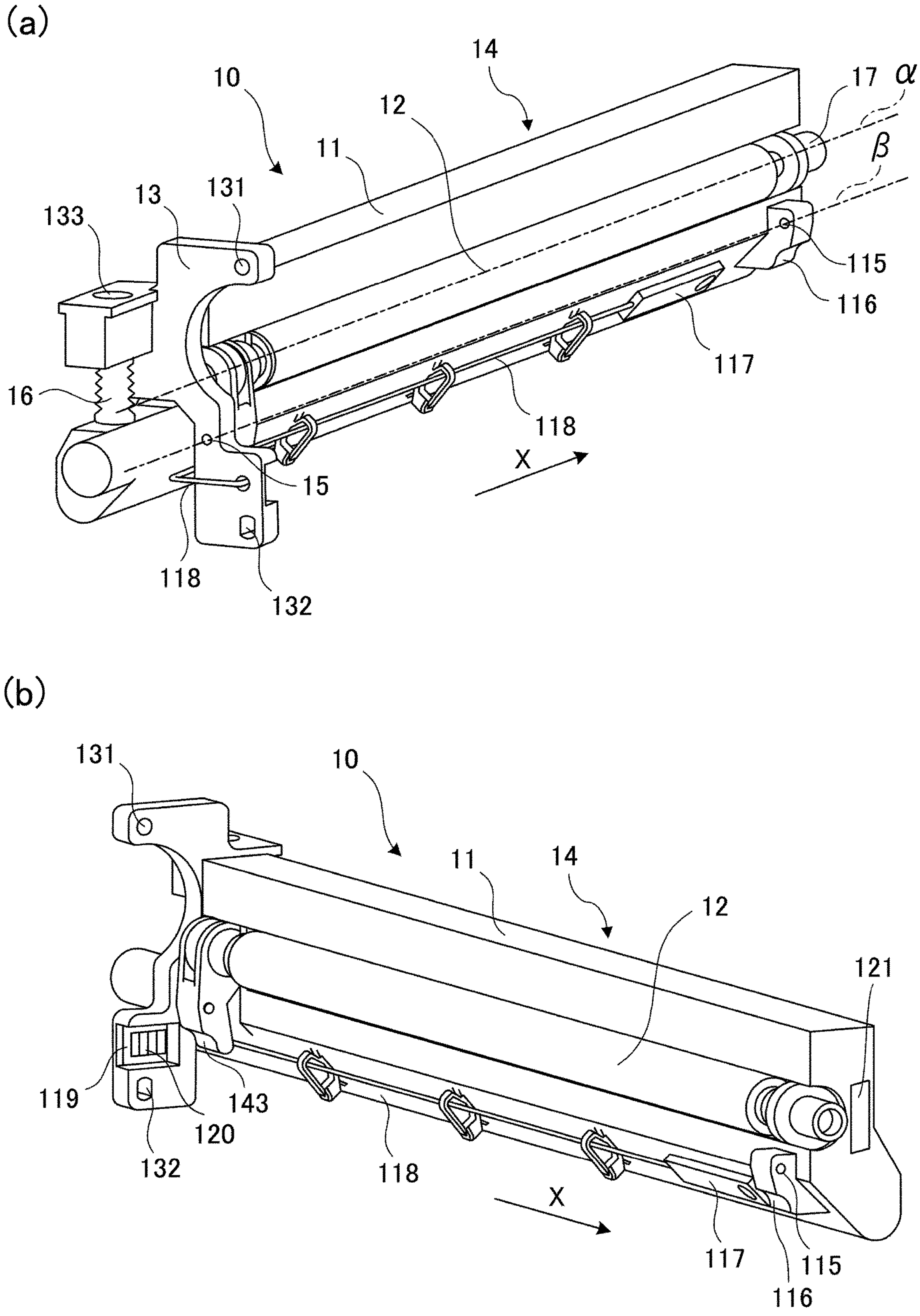

Part (a) of FIG. 4 is a perspective view showing a developing device according to the embodiment, and part (b) of FIG. 4 is a perspective view showing the developing device when it is viewed from an opposite side in a case of part (a) of FIG. 4.

Figure 5:
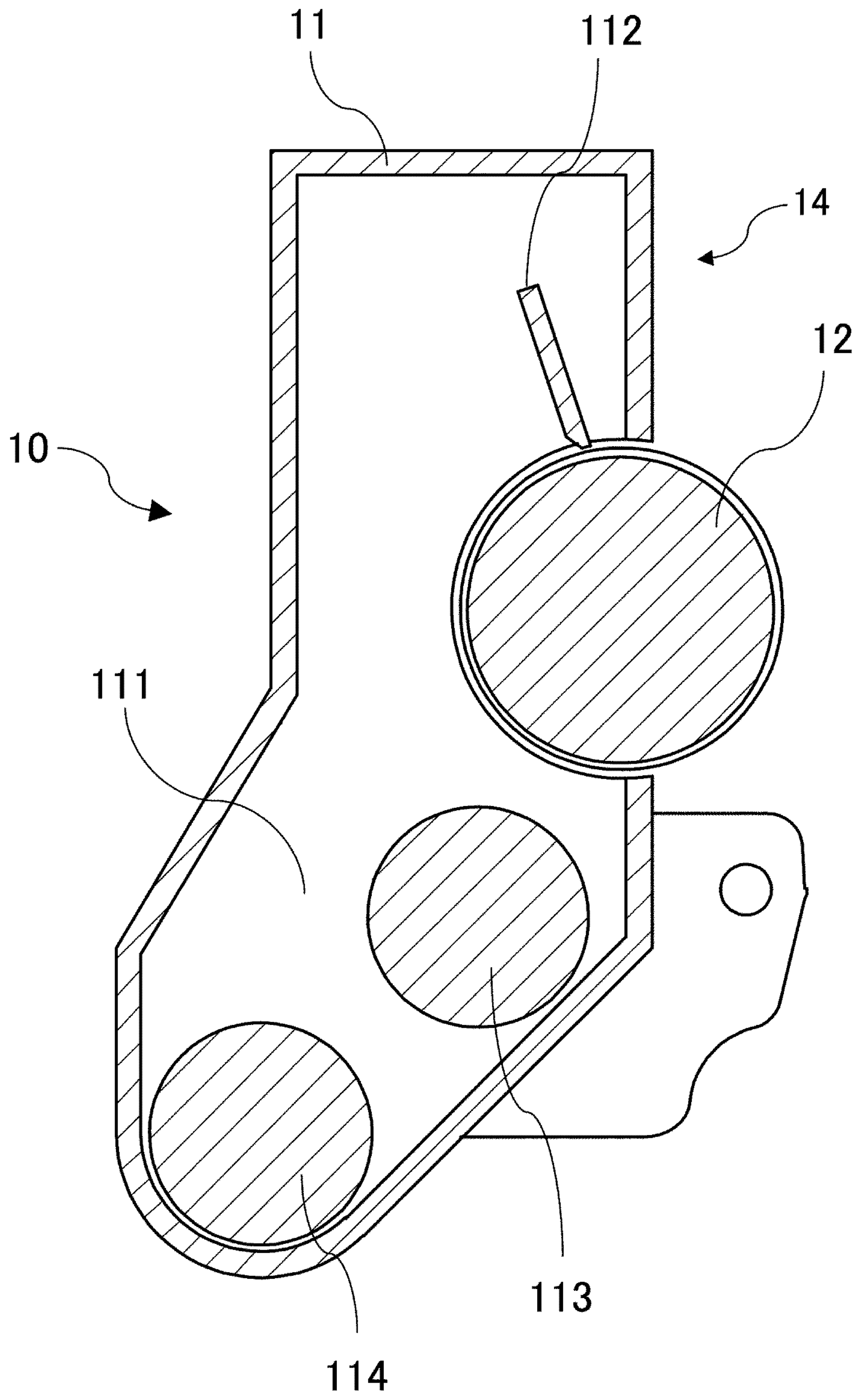

FIG. 5 is a sectional view showing the developing device according to the embodiment.

Figure 6:
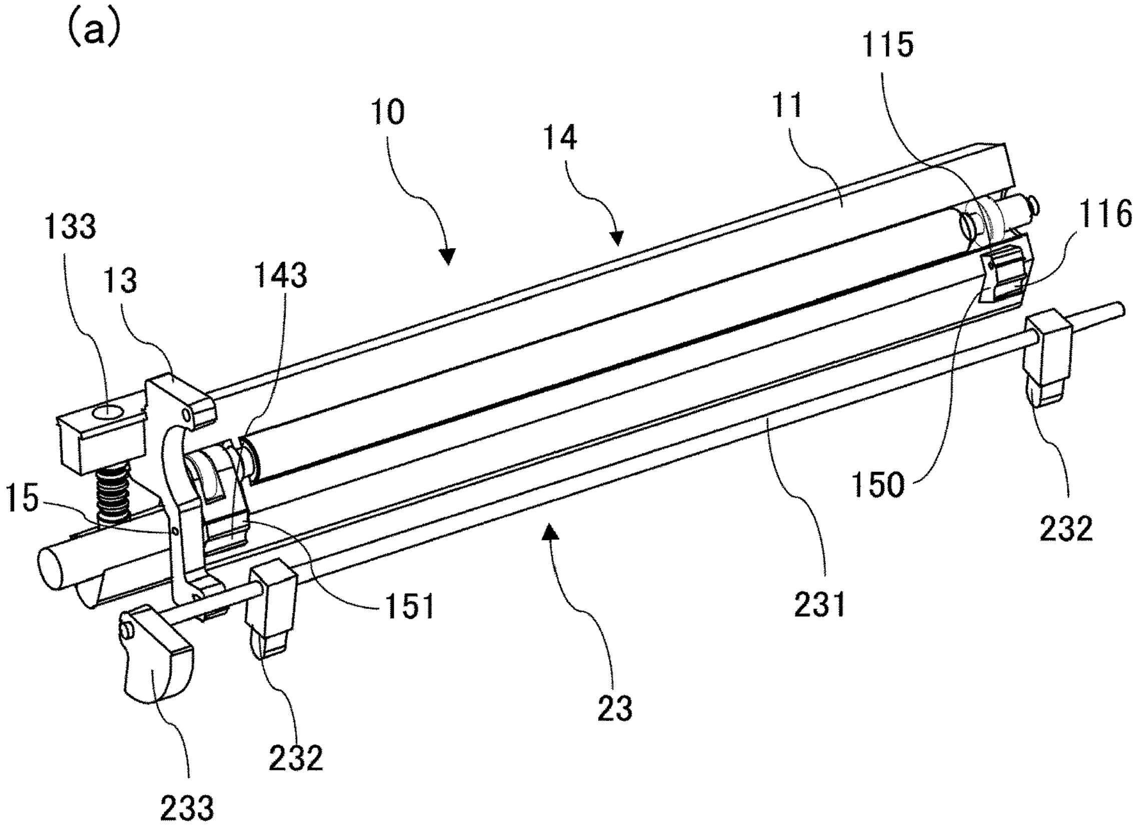
Figure 6:
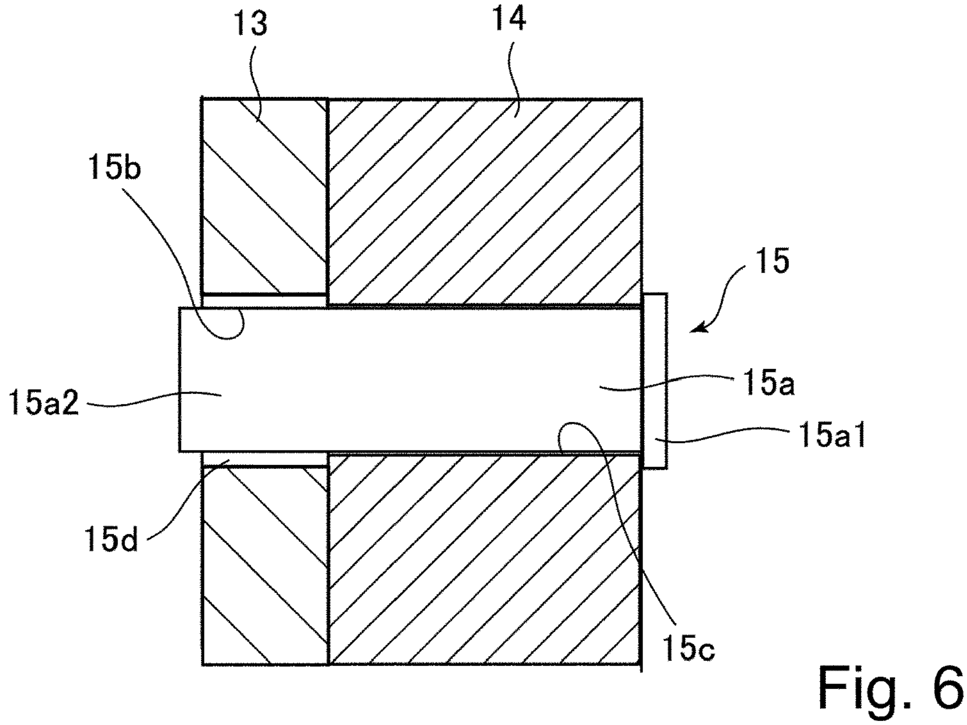

Part (a) of FIG. 6 is a perspective view showing a pressing release state of the developing device according to the embodiment, and part (b) of FIG. 6 is an enlarged sectional view showing an engaging portion.

Figure 7:
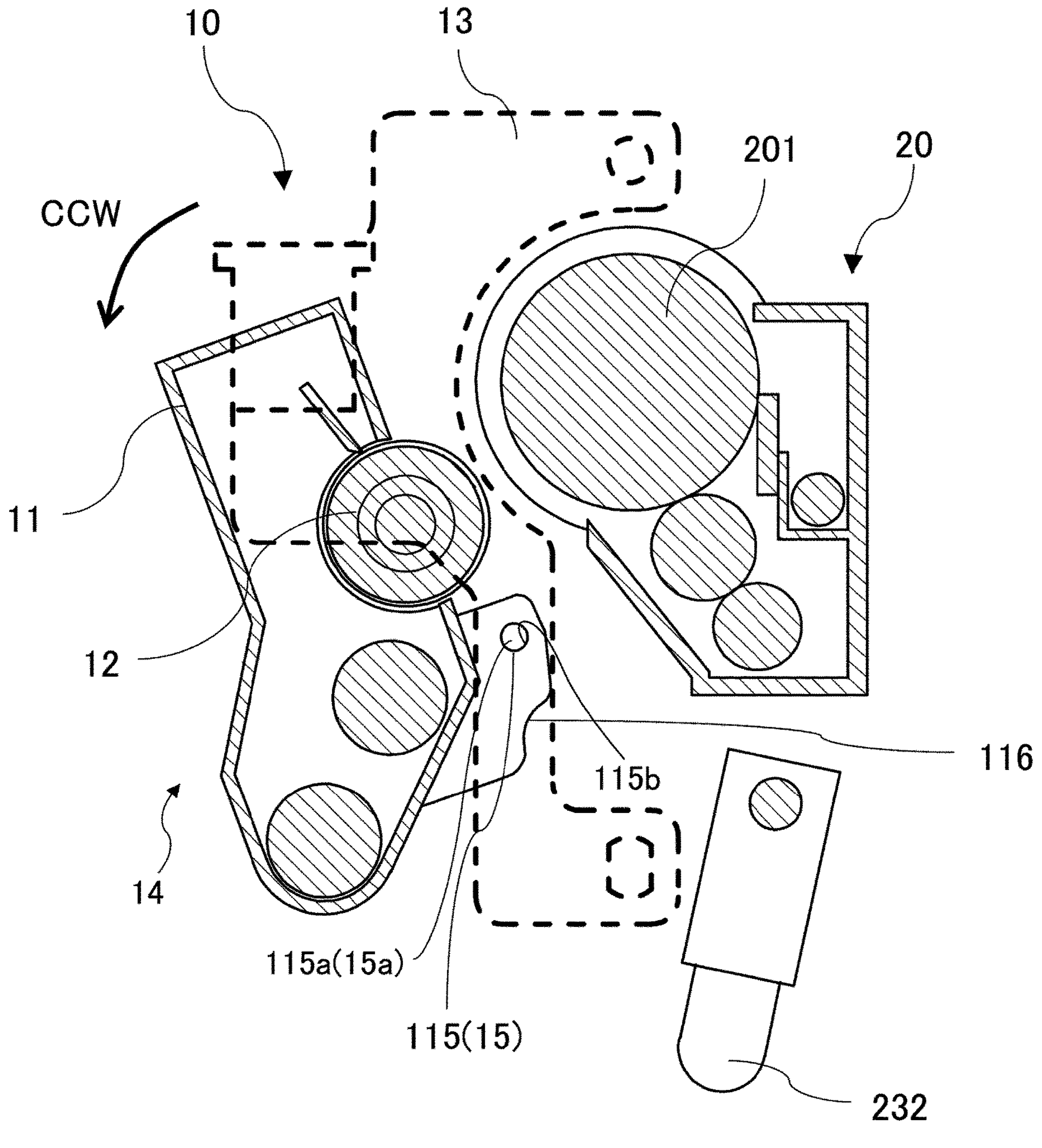

FIG. 7 is a sectional view of the pressing release state of the developing device according to the embodiment.

Figure 8:
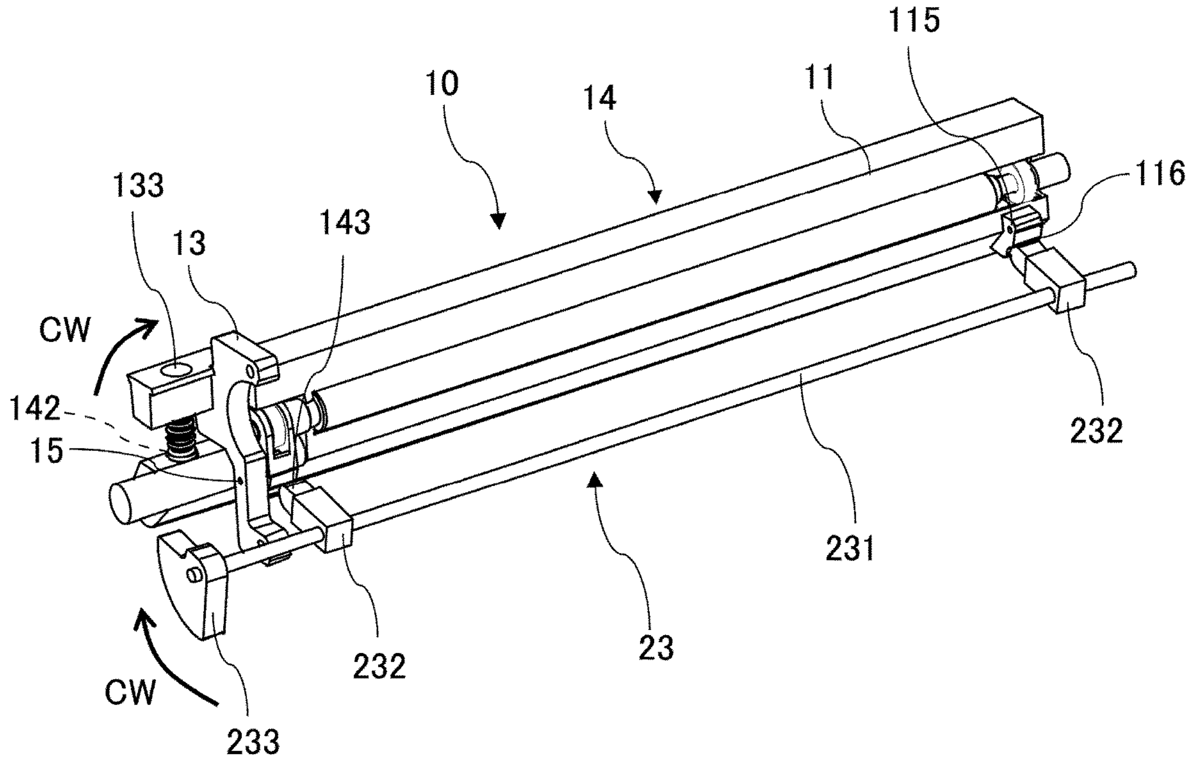

FIG. 8 is a perspective view of the pressing state of the developing device according to the embodiment.

Figure 9:
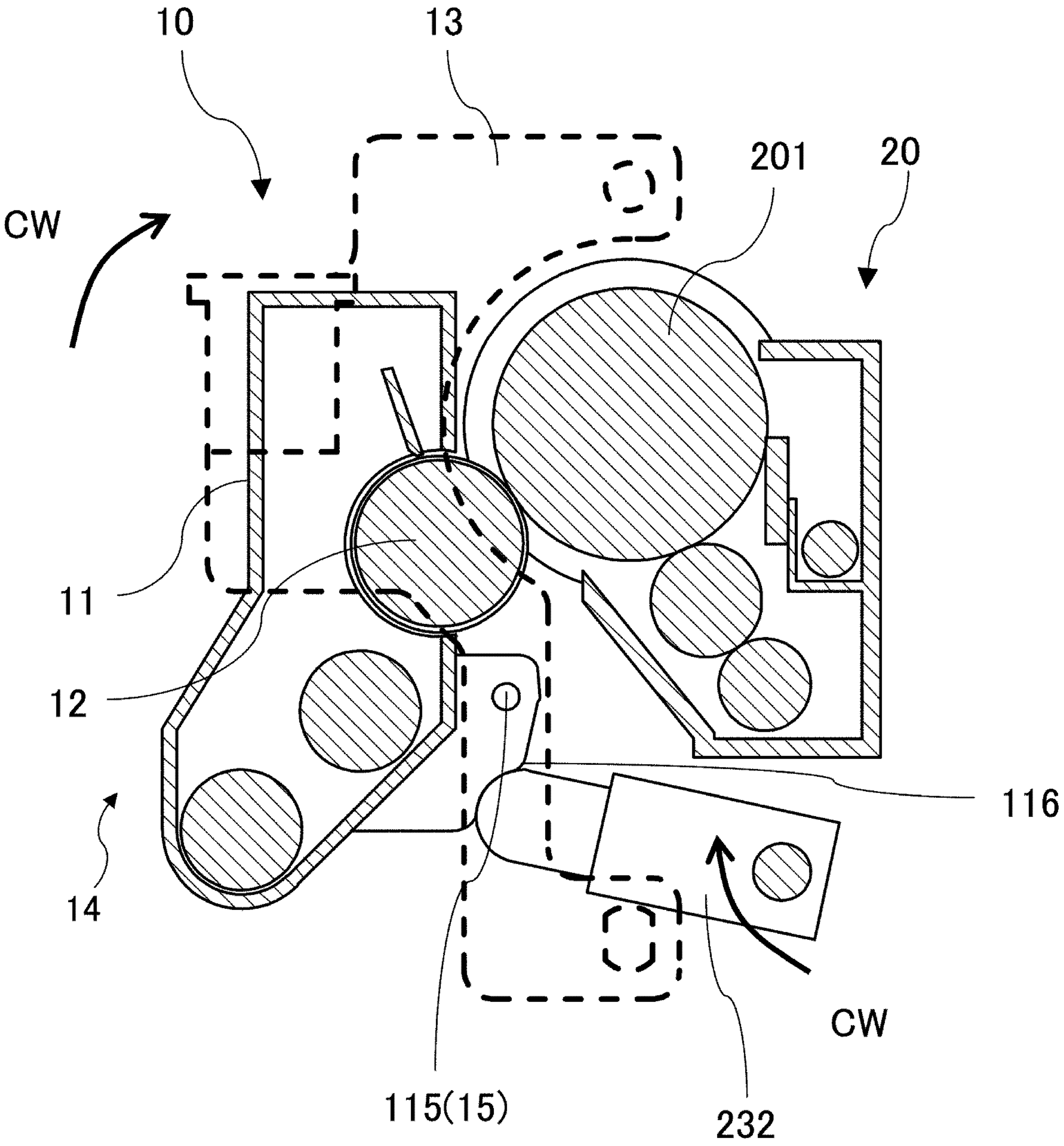

FIG. 9 is a sectional view of the pressing state of the developing device according to the embodiment.

Figure 10:
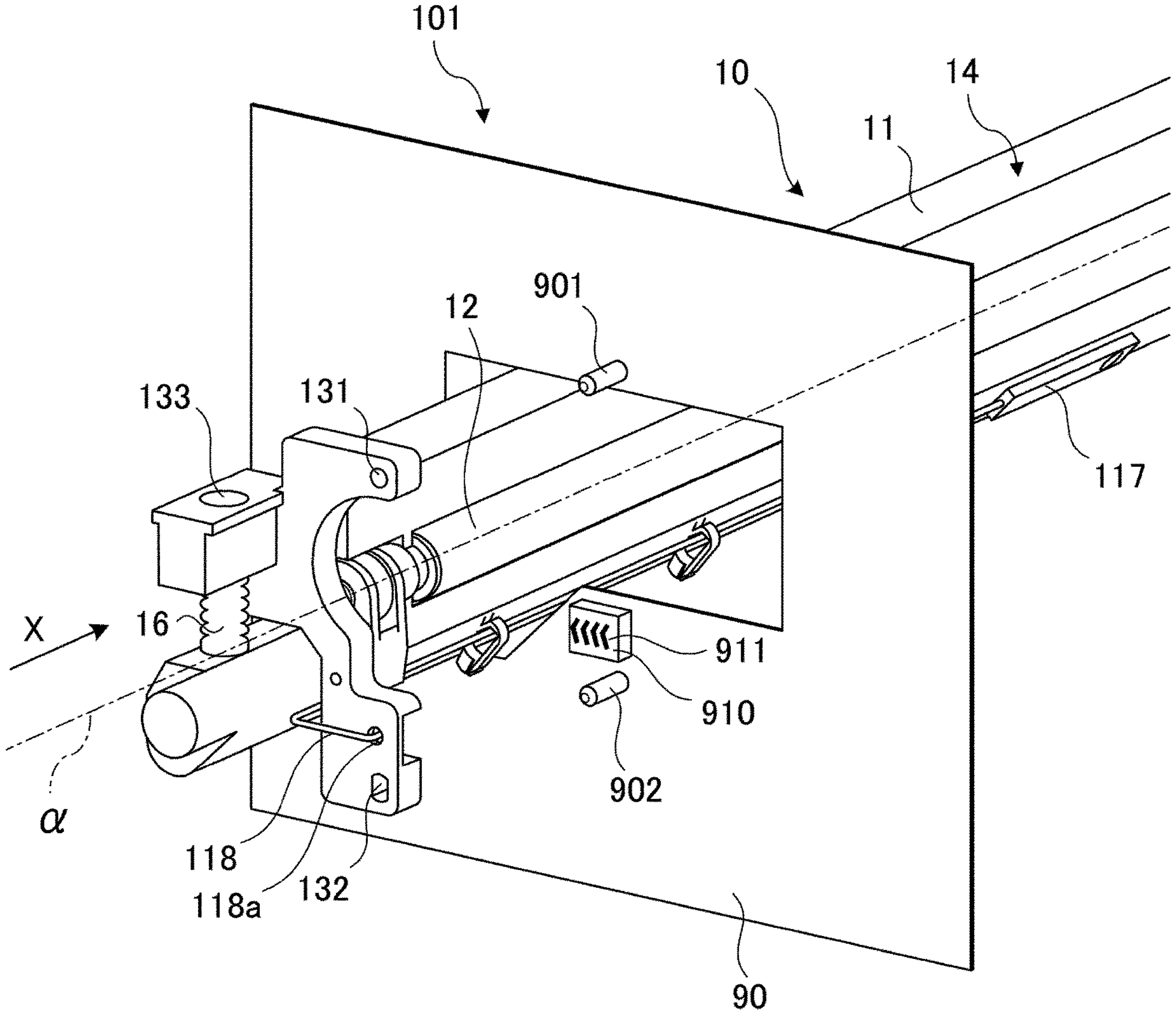

FIG. 10 is a perspective view of a front side portion of the developing device and a frame, showing a state of the developing device according to the embodiment in a process of being inserted into a main assembly of the image forming apparatus.

Figure 11:
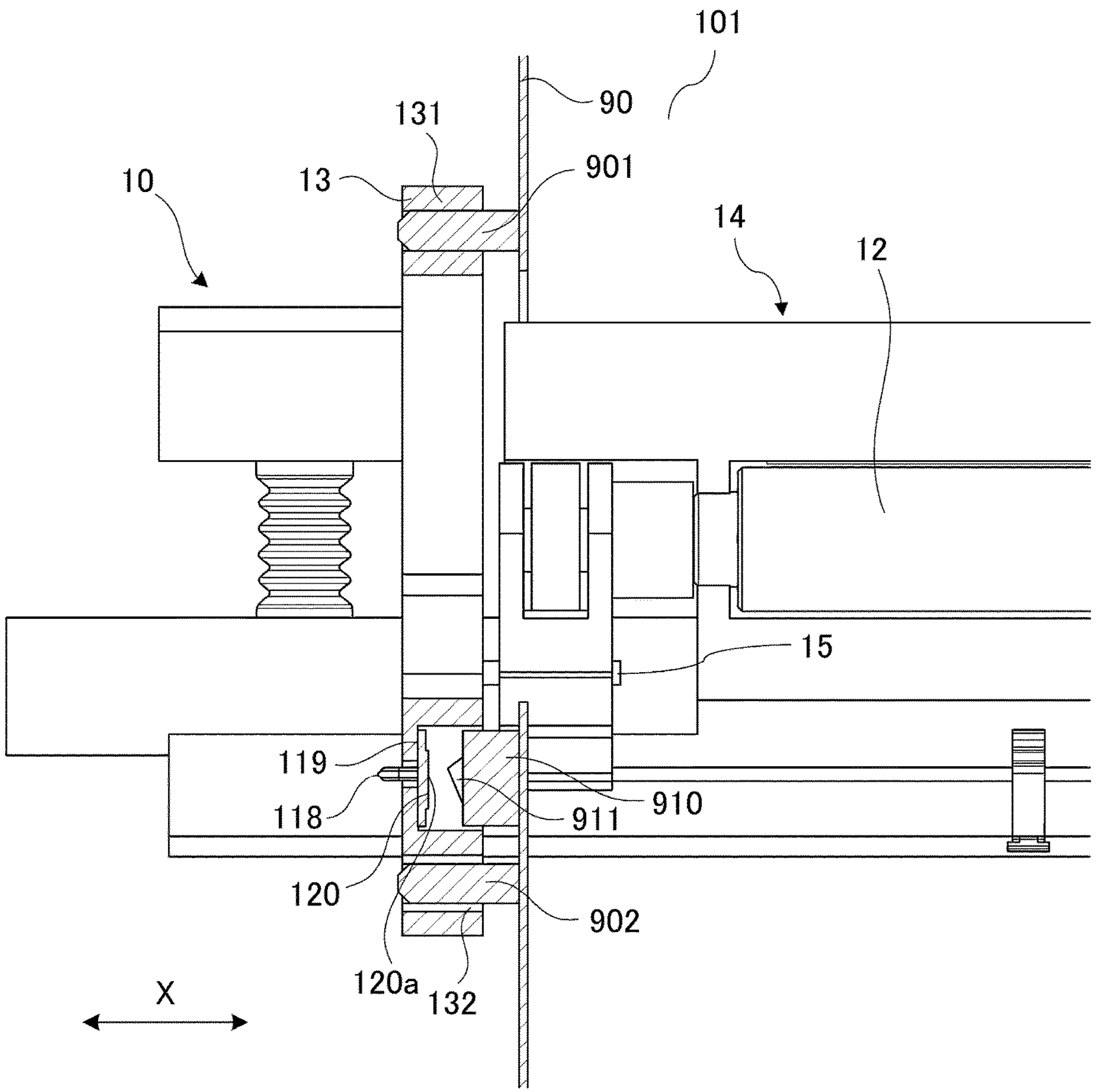

FIG. 11 is a sectional view of the front side portion of the developing device and the frame, showing a state of the developing device according to the embodiment immediately before being positioned in the main assembly of the image forming apparatus.

DESCRIPTION OF THE EMBODIMENTS

An image forming apparatus according to an embodiment of the present invention will be described with reference to FIG. 1 through FIG. 11. First of all, a schematic configuration of the image forming apparatus according to the embodiment will be described with reference to FIG. 1.

[Image Forming Apparatus]

The image forming apparatus 100 according to the embodiment is an electrophotographic tandem type full color printer which is provided with four image forming portions PY, PM, PC and PK which include photosensitive drums 201 as image bearing members respectively. The image forming apparatus 100 forms a toner image on a recording material in accordance with an image signal from a document reading device 102 which is connected to the main assembly of the image forming apparatus 101 or a host device such as a personal computer which is communicably connected to the main assembly of the image forming apparatus 101. As a recording material, sheet material such as paper, plastic film and cloth is included. Further, the image forming portions PY, PM, PC and PK form toner images of yellow, magenta, cyan and black, respectively.

Incidentally, the four image forming portions PY, PM, PC and PK, with which the image forming apparatus 100 is provided, include the substantially same configurations, except that developing colors of the image forming portions are different. Therefore, the image forming portion PY will be described as a representative, and descriptions of other image forming portions will be omitted.

A cylindrical photosensitive member as an image bearing member, that is, the photosensitive drum 201, is arranged in the image forming portion PY. The photosensitive drum 201 is rotationally driven when driving force from an unshown driving portion such as a motor which is provided with the main assembly of the image forming apparatus 101 is transmitted. The charging roller 204 as a charging portion, the developing device 10, the primary transfer roller 31 as a transfer member and the cleaning blade 206 as a cleaning member are arranged around the photosensitive drum 201. The exposure device (a laser scanner in a case of the embodiment) 22 as an exposure portion is arranged below the photosensitive drum 201 in the figure.

Toner is supplied to the developing device 10 from a toner bottle 21 as a toner accommodating container through a toner conveying passage which is not shown. Further, a cleaning roller 205 as a charger cleaning member which cleans a charging member is arranged in the image forming portion PY, while the cleaning roller 205 contacts the charging roller 204 (see FIG. 3). In the embodiment, the charging roller 204 contacts a surface of the photosensitive drum 201 with a predetermined pressing force by a pressing member such as a spring, for example, and is rotated along with rotation of the photosensitive drum 201. Further, the cleaning roller 205 contacts a surface of the charging roller 204 with a predetermined pressing force by a pressing member such as a spring, for example, and is rotated along with rotation of the charging roller 204.

Figure 1:
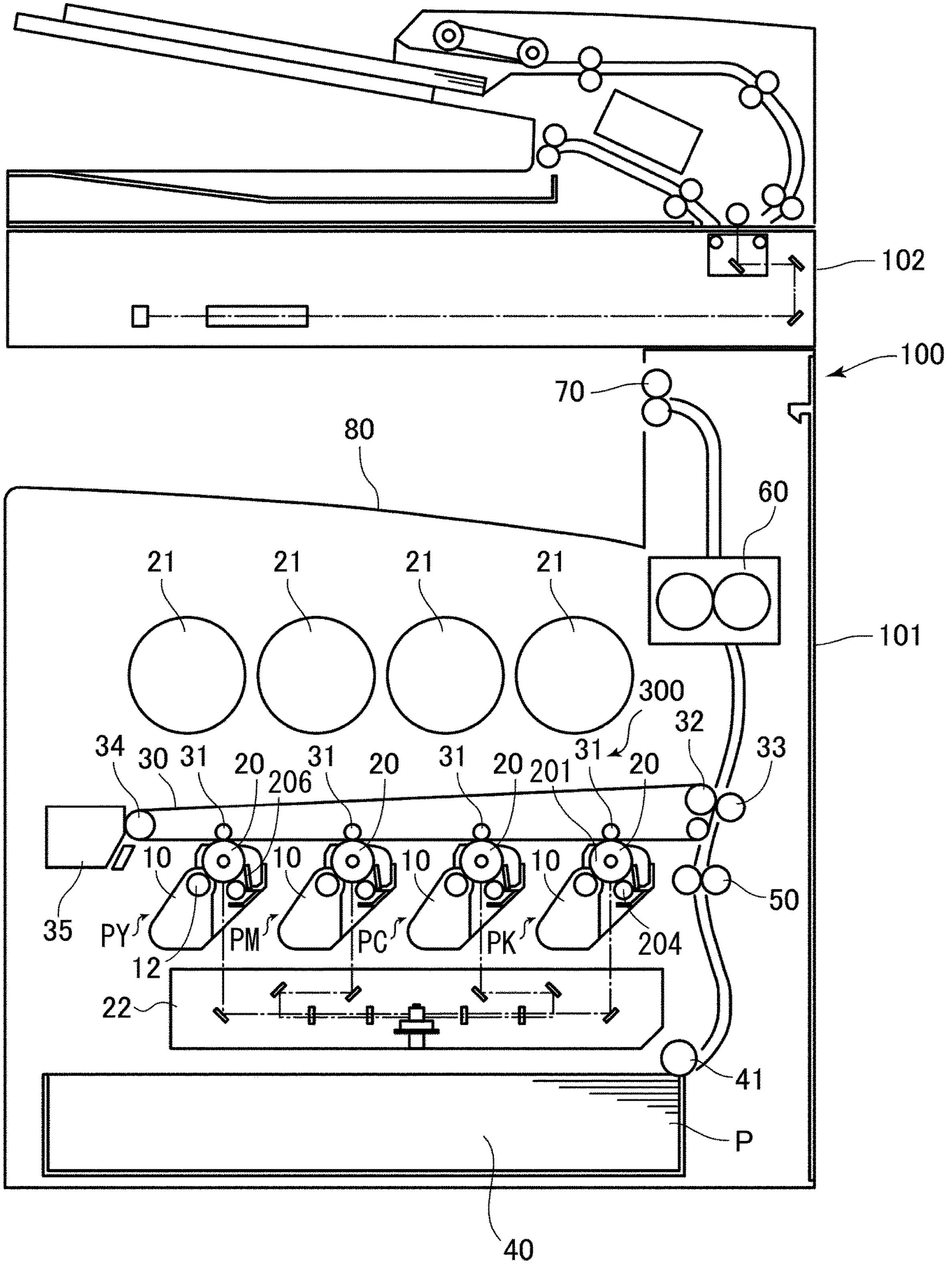
FIG. 1 is a sectional view showing a schematic configuration of an image forming apparatus according to an embodiment.

An intermediary transfer device 300 is arranged above each image forming portion in FIG. 1. The intermediary transfer device 300 is configured so that an intermediary transfer belt 30 which is an endless intermediary transfer member is stretched over a plurality of rollers and moved (rotated) circulatingly. Primary transfer rollers 31 are arranged at positions opposed to the photosensitive drums 201 on an inner peripheral surface side (inside surface side) of the intermediary transfer belt 30. The primary transfer roller 31 is pressed against the photosensitive drum 201 via the intermediary transfer belt 30, and forms a primary transfer portion where the intermediary transfer belt 30 contacts the photosensitive drum 201. The primary transfer roller 31 rotates in accordance with the rotation of the intermediary transfer belt 30.

Further, a secondary transfer roller 32 which is a roller shaped secondary transfer member is arranged at a position opposed to a secondary transfer opposing roller 33 on an outer peripheral surface side (outside surface side) of the intermediary transfer belt 30. The secondary transfer roller 32 is pressed against the secondary transfer opposing roller 33 via the intermediary transfer belt 30, and forms a secondary transfer portion where the intermediary transfer belt 30 contacts the secondary transfer roller 32. Further, a belt cleaning device 35 as an intermediary transfer belt cleaning portion is arranged at a position opposed to a tension roller 34 on the outer peripheral surface side of the intermediary transfer belt 30. The intermediary transfer belt 30 is made of dielectric resin such as polyimide and formed in an endless shape A fixing device 60 which fixes the toner image onto the recording material P is arranged in a downstream of the secondary transfer portion with respect to a recording material feeding direction. The fixing device 60 includes, for example, a fixing roller as a fixing rotatable member which is heated by a heating source such as a heater, and a pressing roller as a pressing rotatable member which forms a fixing nip portion with the fixing roller. And the toner image on the recording material which is conveyed to the fixing nip portion is fixed to the recording material by heating and pressing the toner image.

A cassette 40 which accommodates the recording material P is arranged below the image forming apparatus 100. The recording material P which is fed from the cassette 40 is conveyed toward a registration roller 50 by a conveying roller 41. And when a leading end of the recording material P abuts the registration roller 50 in a stop state and a loop is formed, skewness of the recording material P is corrected. After that, the registration roller 50 starts to rotate in synchronization with the toner image on the intermediary transfer belt 30 and the recording material P is conveyed to the secondary transfer portion.

A process of forming a four color full color image, for example, by using the image forming apparatus 100 which is configured as described above will be described. First of all, when the image forming operation starts, a surface of the photosensitive drum 201 which is rotating is uniformly charged to a predetermined potential of a predetermined polarity by the charging roller 204. In the embodiment, when voltage is applied to the charging roller 204 from a high voltage power source which is not shown and an electrical discharge to the surface of the photosensitive drum 201 is generated, the surface of the photosensitive drum 201 is charged.

Next, the photosensitive drum 201 is scanned and exposed by a laser beam which corresponds to an image signal which is emitted from an exposure device 22. In this way, an electrostatic latent image is formed on the photosensitive drum 201 in accordance with the image signal. The electrostatic latent image on the photosensitive drum 201 (on the image bearing member) is developed into a visible image by the toner as a developer which is accommodated in the developing device 10. In the embodiment, a normal charged polarity of the toner is negative. The developing device 10 includes a developing roller 12 as a developer carrying member which carries the toner and conveys it to an opposing portion (developing position) to the photosensitive drum 201. The developing roller 12 is rotationally driven. Further, during developing, a predetermined developing voltage is applied to the developing roller 12 from the high voltage power source as a developing power source which is not shown in the figure.

The toner image which is formed on the photosensitive drum 201 is primary transferred to the intermediary transfer belt 30 at the primary transfer portion which is configured with the primary transfer roller 31 which is arranged while it nips the intermediary transfer belt 30. At this time, a primary transfer bias, which is a voltage of an opposite polarity to a charging polarity of the toner during developing (positive polarity in the embodiment), is applied to the primary transfer roller 31 from the high voltage power source which is not shown. The toner which is remained on the surface of the photosensitive drum 1 after the primary transfer (transfer residual toner) is removed by the cleaning blade 206, collected in a collected toner conveying passage and discharged outside a photosensitive member unit 20 by a toner conveying screw 207 (see FIG. 3).

Such operations are performed sequentially in the image forming portions of yellow, magenta, cyan and black respectively and the four color toner images on the intermediary transfer belt 30 are superposed. After that, the recording material P which is accommodated in the cassette 40 is conveyed to the secondary transfer portion in accordance with a timing of toner image forming. And, in the secondary transfer portion, the four color toner image on the intermediary transfer belt 30 is secondary transferred onto the recording material P all together by an action of the secondary transfer opposing roller 33. When the recording material P passes through the secondary transfer portion, a secondary transfer voltage which is the opposite polarity of the charging polarity of the toner during developing is applied to the secondary transfer roller 32 from the high voltage power source which is not shown. The toner which is remained on the intermediary transfer belt 30 which is not fully transferred in the secondary transfer portion is removed by the belt cleaning device 35.

Next the recording material P is conveyed to the fixing device 6, and it is heated and pressed by passing through the fixing nip portion. And the toner on the recording material P is melted and mixed and it is fixed to the recording material P as a full color image. After that, the recording material P is discharged by a discharging roller 70 to a discharging tray 80. In this way, a series of image forming processes is finished.

Incidentally, the image forming apparatus 100 according to the embodiment is also able to form single color images or multi color images, for example, a single color black image etc., by using the image forming portions for desired single color or some of four colors.

[Photosensitive Member Unit]

Figure 2:
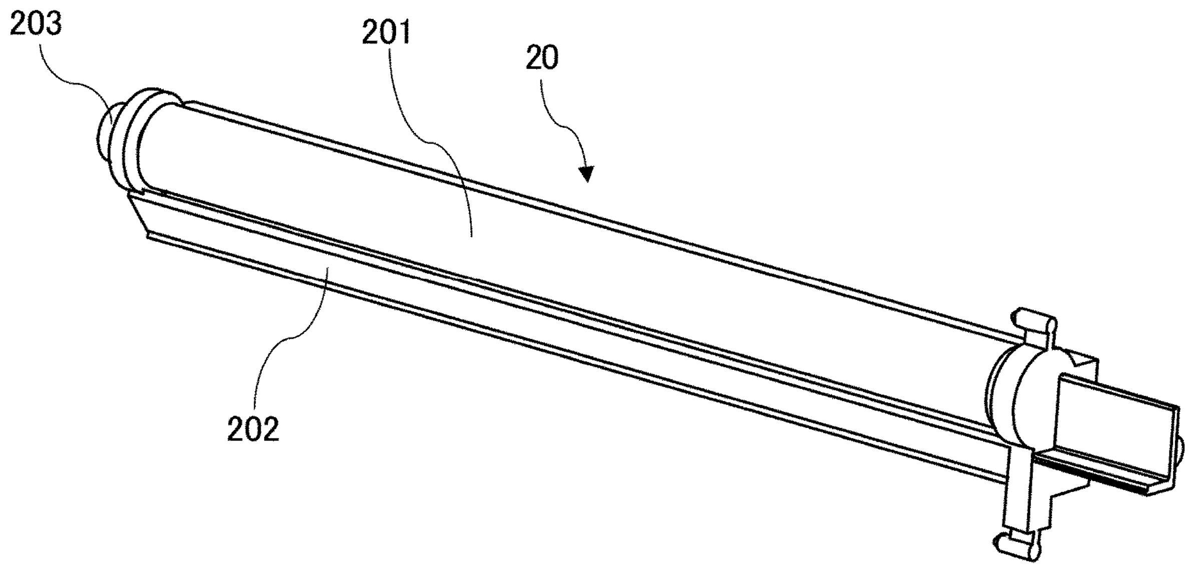
FIG. 2 is a perspective view showing a photosensitive member unit according to the embodiment.
Figure 3:
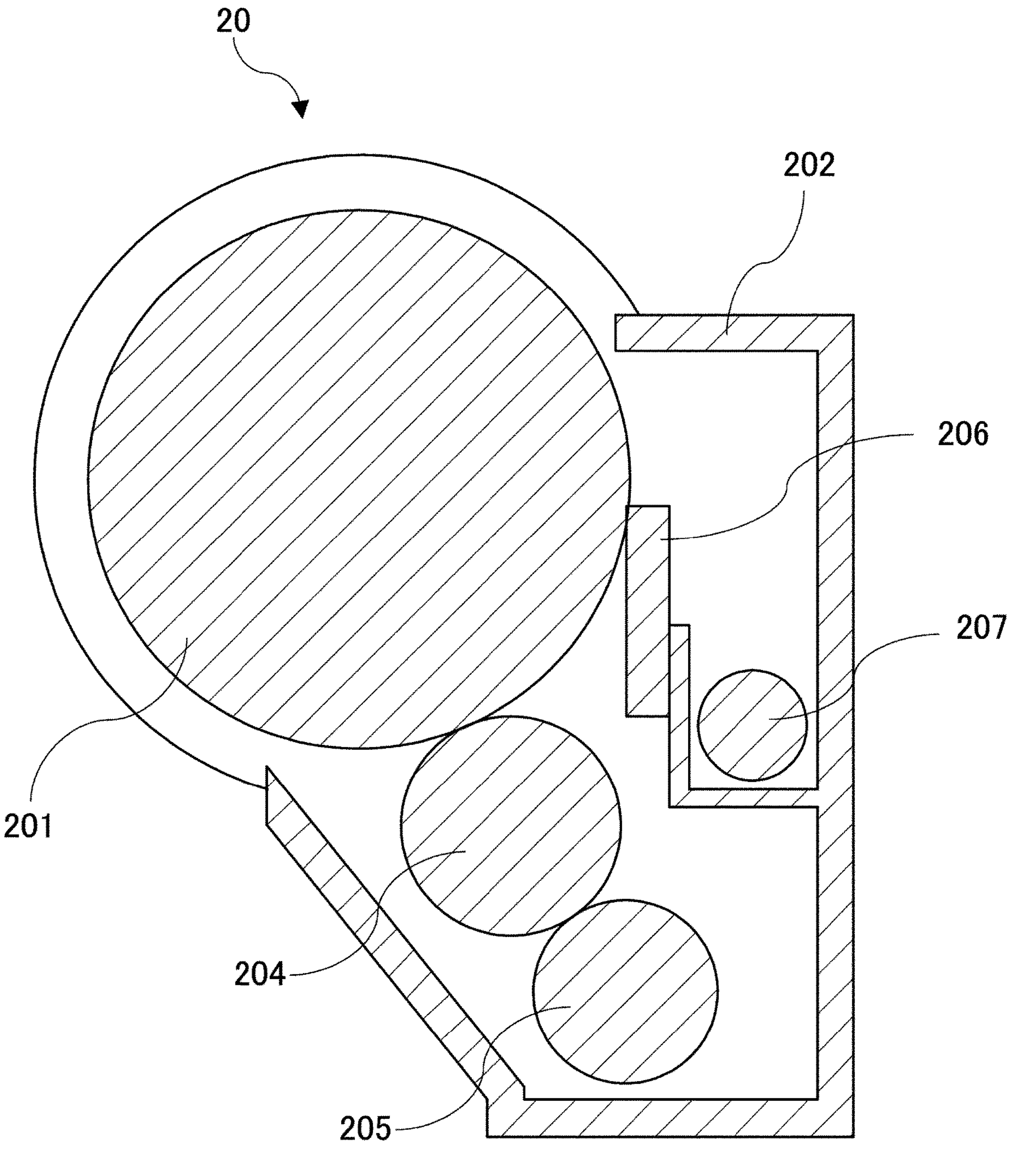
FIG. 3 is a sectional view showing the photosensitive member unit according to the embodiment.

Next, a configuration of the photosensitive member unit 20 will be described by using FIG. 2 and FIG. 3. The photosensitive member unit 20 according to the embodiment is configured so that the photosensitive drum 201 as a photosensitive member, the charging roller 204 as a charging member, the cleaning roller 205 as a charger cleaning member and the cleaning blade 206 as a cleaning member are integrally held by a drum frame 202 as a frame. Further, the photosensitive member unit 20 is configured to be dismountable from the main assembly of the image forming apparatus 101 by sliding it along a longitudinal direction (a direction of a rotational axis of the photosensitive drum 201) to and from the main assembly of the image forming apparatus 101, and it is possible to replace for maintenance, etc.

The photosensitive drum 201 is held by the drum frame 202 so that it is rotatable around the rotational axis via a bearing (not shown). The photosensitive drum 201 is provided with a coupling 203 for rotation by receiving a driving force from a motor as a driving source which is provided with the main assembly of the image forming apparatus 101, which is not shown in the figure, while it is mounted on the main assembly of the image forming apparatus 101.

The charging roller 204 is rotatably supported by a charging roller bearing which is not shown in the figure, and is pressed against the photosensitive drum 201 by a pressing spring which is not shown in the picture. The cleaning roller 205 is rotatably supported by a cleaning roller bearing which is not shown in the picture, and is pressed against the charging roller 204 by a pressing spring which is not shown in the picture. Further, the cleaning blade 206 as a cleaning member for cleaning the surface of the photosensitive drum 201, which is provided to contact the surface of the photosensitive drum 201 in a counter direction with respect to the rotational direction of the photosensitive drum 201 during image forming, is fixed to the drum frame 202.

A toner conveying passage, which collects and conveys the transfer residual toner which is removed from the surface of the photosensitive drum 201 by the cleaning blade 206, is provided near the cleaning blade 206. The toner conveying passage is provided with a toner conveying screw 207 as a conveying member which conveys the collected toner out of the photosensitive member unit 20. The toner, which is conveyed out of the photosensitive member unit 20 by the toner conveying screw 207, is collected in a collected toner container which is not shown in the figure and provided with the main assembly of the image forming apparatus 101.

[Developing Device]

Next, a configuration of the developing device 10 will be described by using part (a) of FIG. 4, part (b) of FIG. 4 and FIG. 5. Incidentally, part (a) of FIG. 4 is a perspective view of the developing device 10 from a front side which will be described below, and part (b) of FIG. 4 is a perspective view of the developing device from a back side which will be described below. The developing device 10 is a developing device of a method which uses a two component developer which includes a nonmagnetic toner and a carrier which has magnetism. The developing device 10 according to the embodiment is configured to be dismountable from the main assembly of the image forming apparatus 101 by sliding it along a longitudinal direction (a direction of a rotational axis of the developing roller 12) to and from the main assembly of the image forming apparatus 101, and it is possible to replace for maintenance, etc.

In the embodiment, the developing device 10 and the photosensitive member unit 20 which are described above are possible to be inserted and withdrawn, respectively, along the longitudinal direction with respect to the main assembly of the image forming apparatus 101. A direction of insertion (X direction) of the developing device 10 and photosensitive member unit 20 is a direction from the front side toward the back side of the image forming apparatus 100 (from a front side toward a back side of the drawing sheet of FIG. 1). The front side of the image forming apparatus 100 is a side on which an operator operates the image forming apparatus 100 and a side on which a control portion such as a control panel, etc., for example, which is for operating the image forming apparatus 100 is arranged. Hereinafter, in a case of simply referring to “the front side” or “the back side”, it is defined as the front side or the back side of the image forming apparatus 100.

The developing device 10 is provided with a toner replenishing port 133 as a replenishing port, and the toner replenishing port is connected to a supply port of the toner conveying passage which is provided with the main assembly of the image forming apparatus 101 when the developing device 10 is mounted on the main assembly of the image forming apparatus 101. The toner conveying passage is connected to the toner bottle 21 which accommodates toner for replenishing as a developer accommodating container. Therefore, the toner for replenishing is supplied to the toner replenishing port 133 from the toner bottle 21 through the toner conveying passage.

Further, the developing device 10 includes a developing container 11 which accommodates the developer and the developing roller 12 as a developer carrying member. The developing roller 12 is rotatably held with respect to the developing container 11 around a rotational axis line a and is configured to develop the electrostatic latent image which is formed on the photosensitive drum 201 at the developing position in which the photosensitive drum 201 and the developing roller 12 are opposed each other. The driving force is transmitted to the developing roller 12 through a coupling 17 from the back side of the image forming apparatus 101.

Further, in the developing device 10, a developing blade 112 which regulates an amount of toner coating on a surface of the developing roller 12 to a certain level, and a screw member 113 and a screw member 114 which agitate and convey the toner in a toner accommodating portion 111 in the developing container 11. In the developing device 10, the developer in the toner accommodating portion 111 is agitated and conveyed by the screw member 113 and the screw member 114, the developer is carried on the surface of the developing roller 12, and layer thickness (amount of coating) of the developer which is carried on the developing roller 12 is regulated by the developing blade 112. And the developer in which the layer thickness is regulated is conveyed to the developing position by the rotation of the developing roller 12 and is used for development of the electrostatic latent image on the photosensitive drum 201. The developer which is remained on the developing roller 12 after the development is collected in the toner accommodating portion 111 and is again agitated and conveyed by the screw member 113 and the screw member 114.

Further, the developing device 10 includes a toner density sensor 117 which detects toner density in the developer which is agitated in the developing container 11. The toner density sensor 117 is an inductance sensor, and its detecting portion which detects the developer is positioned inside the developing container 11 and is partially exposed to an outside. And a bundled cable 118, which is an electrical signal path from the toner density sensor 117 to the main assembly of the image forming apparatus 101, is arranged along a side surface of the developing container 11. The bundled cable 118 connects to a contact board 119. The contact board 119 includes a developing side electrical contact portion 120. The developing side electrical contact portion 120 is formed by an antioxidation surface plating (generally gold plating) and electrical conduction is secured.

Incidentally, as shown in part (b) of FIG. 4, a high voltage contact portion 121, which receives a supply of developing voltage from a side of the main assembly of the image forming apparatus 101, is provided on an end surface of the back side of the developing device 10. The high voltage contact portion 121 is provided on an end surface of a back side of a main body of a developing device 14, which will be described below. Since the main body of the developing device 14 rotates as will be described below, the high voltage contact portion 121 includes a large area so as to maintain contact with a contact portion on a side of the main assembly of the image forming apparatus 101 even when the main body of the developing device 14 rotates.

After insertion into the main body of the image forming apparatus 101, the developing device 10 is positioned with respect to the photosensitive member unit 20 by being pressed by a developing pressing mechanism 23 which will described below, which is provided in the main body of the image forming apparatus 101, and is arranged close to the developing roller 12 and the photosensitive drum 201 so that they are at a predetermined distance. Further, as will be described below, the developing side electrical contact portion 120 contacts a main body side electrical contact portion 911 (see FIG. 10, etc.) which is provided in the main assembly of the image forming apparatus 101 when the developing device 10 is mounted on the main assembly of the image forming apparatus 101.

[Developing Pressing Mechanism]

The developing device 10 is possible to replace for maintenance, etc. as described above, however, in an image forming state, the developing roller 12 and the photosensitive drum 201 are arranged close to each other. Therefore, when the developing device 10 is inserted into or removed from the main assembly of the image forming apparatus 101 in this state, the developing roller 12 or the photosensitive drum 201 may be subjected to sliding scratches. Thus, it is necessary to perform mounting and dismounting of the developing device 10 or the photosensitive member unit 20 under a condition that the developing roller 12 and the photosensitive drum 201 are separated by a sufficient distance so that both of them do not slide against each other.

On this account, the developing device 10 according to the embodiment includes a fixing portion 13 which is fixed to the main assembly of the image forming apparatus 101 and the main body of the developing device 14 which is a movable portion which is possible to move with respect to the fixing portion 13. The fixing portion 13 is positioned on an upstream side of the developing roller 12 with respect to an inserting direction of the developing device 10 into the main assembly of the image forming apparatus 101. That is, the fixing portion 13 is a portion which positions and fixes a front side portion of the developing device 10 with respect to the main assembly of the image forming apparatus 101.

In the embodiment, as will be described below, after positioning the fixing portion 13 on a frame 90 (see FIG. 10, etc.) of the main assembly of the image forming apparatus 101, the fixing portion 13 is fixed to the frame 90 by using a fastening member such as a screw. In this way, the developing device 10 is fixed to the main assembly of the image forming apparatus 101, and it is expected to retain the main assembly of the image forming apparatus 101. Incidentally, retaining of the developing device 10 is not limited to this configuration. For example, a part of a pressing lever 233 or a member which is provided with a pressing shaft 231 may engage an end surface on a front side of the fixing portion 13 in a case that the developing device 14 is positioned at a pressing position by rotating the pressing lever 233, as will be described below, after the developing device 10 is mounted on the main assembly of the image forming apparatus 101. In any case, the developing device 10 may be fixed so that it is prevented from slipping out toward the front side in an insertion direction by fastening or engaging the member on a side of the main assembly of the image forming apparatus 101 and the fixing portion 13 after the fixing portion 13 is positioned on the frame 90.

Further, in a case of the embodiment, a moving direction of the main body of the developing device 14 with respect to the fixing portion 13 is a rotational direction around an engaging portion 15 which will be described below. The main body of the developing device 14 includes the developing roller 12. And due to the developing pressing mechanism 23, the main body of the developing device 14 is possible to move between a first position (a contacting position) in which the developing roller 12 is in proximity to the photosensitive drum 201 and a second position (a separated position) in which the developing roller 12 is separated from the photosensitive drum 201 more than the first position. At the contacting position, a positional relationship between the developing roller 12 and the photosensitive drum 201 is fixed by contacting a portion of the main body of the developing device 14 with a portion of the photosensitive member unit 20.

A configuration and an operation of the developing pressing mechanism 23 will be described by using part (a) of FIG. 6 through FIG. 9. Part (a) of FIG. 6 and FIG. 7 are a perspective view and a sectional view, respectively, showing a developing pressing release state, that is, a state that the developing device 10 is not pressed against the photosensitive member unit 20 and the main body of the developing device 14 is positioned at the second position in which the developing roller 12 is separated from the photosensitive drum 201. FIG. 8 and FIG. 9 are a perspective view and a sectional view, respectively, showing a developing pressing state, that is, a state that the developing device 10 is pressed by the photosensitive member unit 20 and the main body of the developing device 14 is positioned at the first position in which the developing roller 12 is in proximity to the photosensitive drum 201. Part (b) of FIG. 6 is an enlarged sectional view of the engaging portion 15 of the fixing portion 13 and the main body of the developing device 14 which will be described below.

The developing pressing mechanism 23 includes the bar shaped pressing shaft 231 which is arranged in parallel with the longitudinal direction of the developing device 10, and a pressing portion 232 is arranged on the pressing shaft 231. In the embodiment, the pressing portion 232 is provided at two locations, one on a front side and the other on a back side with respect to the pressing shaft 231, and they rotate with the pressing shaft 231, respectively. The pressing lever 233 is engaged on the front side of the pressing shaft 231 with respect to the main assembly of the image forming apparatus 101, and it is possible to rotate the pressing shaft 231 by operating the pressing lever 233. Further, the pressing portion 232 is pressed to protrude in a direction away from the pressing shaft 231 by a pressing member such as a spring which is not shown in the figure.

As shown in FIG. 7 and FIG. 9, in a state that the developing device 10 is mounted on the main assembly of the image forming apparatus 101, the main body of the developing device 14 is connected to the fixing portion 13 by the engaging portion on the front side and is connected to the main assembly of the image forming apparatus 101 by the engaging portion 115 on the back side. And the main body of the developing device 14 is rotatable around a rotational axis line ß (see FIG. 4) of a rotational shaft **15*a* and a rotational shaft 115*a* of the engaging portion 15 and the engaging portion 115, respectively. The rotational shaft 15*a* and the rotational shaft 115*a* are arranged on the same axis. In the embodiment, for the back side of the developing device 10, the main body of the developing device 14 is positioned directly with respect to the main assembly of the image forming apparatus 101. On the other hand, for the front side of the developing device 10, the main body of the developing device 14 is positioned with respect to the main assembly of the image forming apparatus 101 via the fixing portion 13**.

The engaging portion 115 on the back side is an engaging portion between the rotational shaft **115*a* which is provided on the back side of the main assembly of the image forming apparatus 101 and a hole portion 115*b* which is formed in a mounting portion 150 which is provided on the back side of the main body of the developing device 14. That is, when the developing device 10 is inserted, the hole portion 115*b* which is provided on the back side of the main body of the developing device 14 engages (specifically, fits into) the rotational shaft 115*a* which is provided on the back side of the main assembly of the image forming apparatus 101 so that it protrudes toward the front side. In this way, the back side of the main body of the developing device 14 is positioned so that it is rotatable around the engaging portion 115 between the hole portion 115*b* and the rotational shaft 115*a***.

As shown in part (b) of FIG. 6, the engaging portion 15 on the front side is configured of a first hole portion **15*b* which is provided in the fixing portion 13, a second hole portion 15*c* which is provided in the main body of the developing device 14, and the rotational shaft 15*a* as a shaft portion which is engaged with the first hole portion 15*b* and the second hole portion 15*c*. The rotational shaft 15*a* is a bolt in which a head portion 15*al* is provided on a base end portion and its outer peripheral surface on a front end is a screw portion 15*a*2. An insert nut 15*d* is provided in the fixing portion 13, and an inner peripheral surface of the insert nut 15*d* configures the first hole portion 15*b*. That is, the inner peripheral surface of the first hole portion 15*b* is a female screw. Incidentally, the inner peripheral surface of the second hole portion 15*c* is a cylindrical surface in which a screw portion is not formed. Further, a female screw portion may be formed directly on the inner peripheral surface of the first hole portion 15*b***.

When connecting the fixing portion 13 and the main body of the developing device 14, the first hole portion **15*b* in the fixing portion 13 and the second hole portion 15*c* which is formed in the mounting portion 151 which is provided on the front side of the main body of the developing device 14 are arranged in the same axis, and the rotational shaft 15*a* is inserted through the second hole portion 15*c*. And, by screwing and fixing the screw portion 15*a*2 of the rotational shaft 15*a* to the first hole portion 15*b*, the mounting portion 151 is held between the fixing portion 13 and the head portion 15*a*1. In this way, the main body of the developing device 14 is connected to the fixed portion 13 so that it is rotatable around the rotational shaft 15*a* by the engaging portion 15**.

Incidentally, the engaging portion 115 on the back side may be provided with a rotational shaft on the side of the main body of the developing device 14 and a hole portion on the side of the main assembly of the image forming apparatus 101. Further, the engaging portion 15 on the front side may be configured so that the rotational shaft 15*a* is inserted from the first hole portion 15*b* by setting the inner peripheral surface of the second hole portion 15*c* as a female screw portion and setting the inner peripheral surface of the first hole portion 15*b* as a cylindrical surface which does not include a screw portion. In this case, since the fixing portion 13 is held between the head portion 15*al* of the rotational shaft 15*a* and the mounting portion 151 of the main body of the developing device 14, the main body of the developing device 14 is connected to the fixing portion 13 while it is rotatable around the rotational shaft 15*a*. Further, the engaging portion 15 on the front side may be configured of a shaft portion which is provided with one of the fixing portion 13 and the main body of the developing device 14 and a hole portion which is possible to engage with a shaft portion which is provided with the other one. For example, a shaft is provided in the fixing portion 13 and a hole portion is provided in the main body of the developing device 14. Further, a leading end of the shaft portion is a screw portion and a nut is screwed onto the screw portion after the shaft portion is inserted through the hole portion, so the fixed portion 13 and the main body of the developing device 14 are connected. A relationship between the shaft portion and the hole portion, of course, may be reversed. That is, the shaft portion may be provided on a side of the main body of the developing device 14 and the hole portion may be provided on a side of the fixing portion 13.

In the embodiment, the rotational shaft 115*a* and the hole portion 115*b* which configure the engaging portion 115 on the back side, and the rotational shaft 15*a* and the second hole portion 15*c* which configure the engaging portion 15 on the front side, are engaged (specifically, fitted) so that the main body of the developing device 14 are rotatable around the engaging portion 15 and the engaging portion 115, respectively.

In this way, the main body of the developing device 14 in the developing device 10 is possible to rotate around the rotational shaft 15*a* and the rotational shaft 115*a* as a rotational center, so that it is movable between the contacting position and the separated position with respect to the photosensitive member unit 20. When the main body of the developing device 14 is only mounted at a mounting position with respect to the main assembly of the image forming apparatus 101, as shown in FIG. 7, it is tilted in a CCW direction which is a counterclockwise direction in the figure by its own weight around the rotational axis line B of the rotational shaft 15*a* and the rotational shaft 115*a*, and the developing roller 12 is separated from the photosensitive drum 201. That is, the main body of the developing device 14 is in the separated position. In this way, when the developing roller 12 and the photosensitive drum 201 are separated from each other, the developing device 10 is possible to be mounted on and dismounted from the main assembly of the image forming apparatus 101 without colliding or contacting each other.

When the pressing lever 233 is rotated in a CW direction which is a clockwise direction while the developing device 10 is mounted on the main assembly of the image forming apparatus 101, as shown in FIG. 8 and FIG. 9, the pressing portion 232 on the pressing shaft 231 contacts a pressing force receiving portion 143 and a pressing force receiving portion 116 as contacting portions which are provided on the main body of the developing device 14. The pressing force receiving portion 143 and the pressing force receiving portion 116 are formed on the mounting portion 151 and the mounting portion 150 on the back side and the front side of the main body of the developing device 14, respectively.

And the main body of the developing device 14 rotates in the CW direction which is the clockwise direction around the rotational axis line B of the rotational shaft 15*a* and the rotational shaft 115*a*, and the developing roller 12 moves to the contacting position (the first position) in which the developing roller 12 is in proximity to the photosensitive drum 201. In this case, the main body of the developing device 14 is pressed in the CW direction which is the clockwise direction when the pressing portion 232 is pressed by a pressing member which is not shown. The position of the pressing portion 232 in this case is defined as a third position.

Further, when the main body of the developing device 14 is in a state of contacting the photosensitive member unit 20, as shown in FIG. 6 and FIG. 7, a state that the pressing portion 232 on the pressing shaft 231 contacts the pressing force receiving portion 143 and the pressing force receiving portion 116 is released by rotating the pressing lever 233 in the CCW direction which is the counterclockwise direction. And the main body of the developing device 14 tilts in the CCW direction which is the counterclockwise direction, the contacting state of the developing roller 12 and the photosensitive drum 201 is released, and the developing roller 12 moves to the separated position (the second position). The position of the pressing portion 232 in this case is defined as a fourth position. In this way, the pressing portion 232 is movable between the third position in which it contacts the pressing force receiving portion 143 and the pressing force receiving portion 116 and presses the main body of the developing device 14 in the contacting position as shown in FIG. 8 and FIG. 9, and the fourth position in which it is separated from the pressing force receiving portion 143 and the pressing force receiving portion 116 and the main body of the developing device 14 is movable to the separated position as shown in FIG. 6 and FIG. 7.

As described above, the developing device 10 is divided into the main body of the developing device 14 as a movable portion which rotates around the rotational shaft 15*a* and the rotational shaft 115*a* by pressing force of the developing pressing mechanism 23, and the fixing portion 13 which is fixed to the main assembly of the image forming apparatus 101. Specifically, the fixing portion 13 is positionally regulated by the main assembly of the image forming apparatus 101 and is connected to the main body of the developing device 14 by an engaging portion (a first connecting portion) 15 via the rotational shaft 15*a*.

Further, the toner replenishing port 133, in which the developer is replenished from the side of the main assembly of the image forming apparatus 101, is provided in the fixing portion 13. The toner replenishing port 133 is connected to a connecting port 142 (FIG. 4 and FIG. 8) which is provided in the main body of the developing device 14 by a developer conveying passage 16 which is formed by an elastic member in a bellows shape. The connecting port 142 communicates with the toner accommodating portion 111 inside the main body of the developing device 14. That is, the developer conveying passage 16 is arranged between the fixing portion 13 and the main body of the developing device 14, connects the toner replenishing port 133 and the connecting port 142, and supplies the developer which is supplied from the toner replenishing port 133 to the toner accommodating portion 111 inside the main body of the developing device 14 via the connecting port 142. The developer conveying passage 16 is elastically deformable and is a configuration which is capable of communicating the toner replenishing port 133 and the connecting port 142 even when the main body of the developing device 14 are in either positions of the contacting position (pressing position) and the separated position (pressing releasing position).

[Positioning Configuration on the Front Side of the Developing Device]

Next, a positioning configuration on the front side of the developing device 10 according to the embodiment with respect to the main assembly of the image forming apparatus 101 will be described by using FIG. 10 and FIG. 11. FIG. 10 is a view showing a state that the developing device 10 is in a process of being inserted into the main assembly of the image forming apparatus 101. FIG. 11 is a view showing a state just before the front side of the developing device 10 is positioned with respect to the main assembly of the image forming apparatus 101.

The developing device 10 is possible to be inserted into and removed from the main assembly of the image forming apparatus 101 in an X direction which is shown in FIG. 10. The X direction is parallel to a longitudinal direction of the developing device 10, that is, the a direction of the rotational axis line of the developing roller 12. The main assembly of the image forming apparatus 101 is provided with a first positioning shaft 901 and a second positioning shaft 902 for positioning the developing device 10 with respect to the main assembly of the image forming apparatus 101. The first positioning shaft 901 and the second positioning shaft 902 are formed on the frame 90 on the front side of the main assembly of the image forming apparatus 101 so as to project toward the front side along a first direction. The first direction is parallel to a central axis 901A of the first positioning shaft 901 and is also parallel to the X direction which is a direction of insertion and removal of the developing device 10.

On the other hand, the developing device 10 is provided with a first positioning hole 131 and a second positioning hole 132 which engage the first positioning shaft 901 and the second positioning shaft 902 of the main assembly of the image forming apparatus 101. The first positioning hole 131 and the second positioning hole 132 are formed in the fixing portion 13 so as to be penetrated along a second direction and a predetermined direction. The second direction and the predetermined direction are parallel to a central axis 131A of the first positioning hole 131.

Here, the first positioning hole 131 is a hole for positioning the developing device 10, and the second positioning hole 132 is a long hole which functions as a hole for rotation stop of the developing device 10. The second positioning hole 132 is formed so that it is longer in a vertical direction than the first positioning hole 131 when the developing device 10 is mounted on the main assembly of the image forming apparatus 101.

Therefore, when the developing device 10 is mounted, first of all, positioning of the developing device 10 is performed by entering the first positioning shaft 901 into the first positioning hole 131. In this case, the second positioning shaft 902 also enters the second positioning hole 132, however, since the second positioning hole 132 is a long hole, it is not positioned in the vertical direction, but it restricts rotation around an engaging portion between the first positioning hole 131 and the first positioning shaft 901.

In the embodiment, the first positioning hole 131 corresponds to a positioned portion, and the first positioning shaft 901 which engages the first positioning hole corresponds to a positioning portion. Incidentally, a relationship between the shaft and the hole may be reversed. That is, one of the positioning portion and the positioned portion is a hole portion which is formed along the first direction, and the other one may be a protruding portion which is formed along the second direction and is capable of engaging with the hole portion. Basically, the positioning portion and the positioned portion may only be a shape which can be positioned when the developing device 10 is inserted into the main assembly of the image forming apparatus 101. Incidentally, for the second positioning shaft 902 and the second positioning hole 132, the relationship between the shaft and the hole may be reversed in the same way.

[Electrical Connecting Configuration]

Next, with reference to part (a) and part (b) of FIG. 4, an electrical connecting configuration between the developing device 10 and the main assembly of the image forming apparatus 101 according to the embodiment will be described by using FIG. 10 and FIG. 11. As described above, the developing device 10 is provided with the developing side electrical contact portion 120. The developing side electrical contact portion 120 is a contact portion for communication with a side of the main assembly of the image forming apparatus, and in the embodiment, it is a contact portion for communication between the toner density sensor 117 and a side of the main assembly of the image forming apparatus 101. Further, in the embodiment, the developing side electrical contact portion 120 is provided in the fixing portion 13. Further, the developing side electrical contact portion 120 includes a contact surface 120*a* which contacts the main body side electrical contact portion 911 which will be described below. The contact surface 120*a* is a substantially parallel surface to a direction of gravity.

The developing side electrical contact portion 120 is arranged on a surface of the back side of the fixing portion 13. Therefore, in the embodiment, a through hole 118*a*, which is possible to insert the bundled cable 118 into the fixing portion 13, is provided, and the bundled cable 118 is possible to connect the contact board 119 from a surface which is provided with the developing side electrical contact portion 120 and an opposite side of the surface. Incidentally, when the bundled cable 118 is possible to connect the contact board 119 on the back side of the fixing portion 13, the through hole 118*a* may be omitted.

Incidentally, the developing side electrical contact portion 120 may be a contact portion for communicating between another sensor such as a sensor which detects an amount of the developer in the developing container 11, for example, other than the toner density sensor 117 and the main assembly of the image forming apparatus 101, and it may be a contact portion for communicating between a plurality of sensors and the main assembly of the image forming apparatus 101. Further, in the embodiment, the high voltage contact portion 121 which receives the supply of the developing voltage is provided on a back side of the developing device 10, however, the developing side electrical contact portion 120 may be a high voltage contact portion.

On the other hand, the main body side electrical contact portion 911 is provided as a contact portion which receives an electrical signal such as a signal of the toner density sensor 117 from the developing device 10 on the side of the main assembly of the image forming apparatus 101. In the embodiment, a contact board 910 which is connected to a control portion inside the main assembly of the image forming apparatus 101 is provided in the frame 90, and the contact board 910 includes the main body side electrical contact portion 911. The main body side electrical contact portion 911 is arranged on a surface of a front side of the frame 90. And when the developing device 10 is inserted, it is possible to contact the developing side electrical contact portion 120 which is provided on the surface of the back side of the fixing portion 13 and the main body side electrical contact portion 911 which is provided on the surface of the front side of the frame 90.

That is, the developing side electrical contact portion 120 and the main body side electrical contact portion 911 contact each other, after the developing device 10 is inserted into the main assembly of the image forming apparatus 101 along the longitudinal direction, the first positioning hole 131 and the second positioning hole 132 on the side of the developing device 10 are engaged with the first positioning shaft 901 and the second positioning shaft 902, and the fixing portion 13 is generally positioned with respect to the main assembly of the image forming apparatus 101. And the fixing portion 13 is fixed to the main assembly of the image forming apparatus 101 after the developing device 10 is pressed further in an insertion direction and mounted at a predetermined position.

Here, a reason why the developing side electrical contact portion 120 is arranged so that the developing side electrical contact portion 120 contacts the main body side electrical contact portion 911 after the first positioning hole 131 and the second positioning hole 132 are positioned at the first positioning shaft 901 and the second positioning shaft 902, will be described below. That is, when the developing side electrical contact portion 120 contacts the main body side electrical contact portion 911 before the fixing portion 13 which holds the developing side electrical contact portion 120 is positioned with respect to the main assembly of the image forming apparatus 101, a conductive elastic member which is included in the main body side electrical contact portion 911 may contact an area other than a predetermined area (that is, the developing side electrical contact portion 120) and the main body side electrical contact portion 911 may be deformed or damaged. Further, by setting a relationship in which the developing side electrical contact portion 120 contacts the main body side electrical contact portion 911 after the fixing portion 13 is generally positioned with respect to the main assembly of the image forming apparatus 101, it is possible to reduce risk of deformation or damage even for users who are not familiar with handling an image forming apparatus.

In general, the conductive elastic member which is included in the main body side electrical contact portion 911 is configured to contact the developing side electrical contact portion 120 with a force F of approximately 100 g to 800 g each and to secure electrical conduction. Therefore, the developing device 10 which includes the developing side electrical contact portion 120, and the main assembly of the image forming apparatus 101 which includes the main body side electrical contact portion 911, are subjected to the force F in an action and reaction relationship, respectively. In a case that the force F is received at any area of the main body of the developing device 14 via the developing side electrical contact portion 120, for example, on the side of the developing device 10, the developing container 11, for example, of the main body of the developing device 14, may be deformed and a contact pressure to contact the main body of the developing device 14 with the photosensitive member unit 20 in order to ensure a gap between the developing roller 12 and the photosensitive drum 201 may become unstable. And when the contact pressure is increased to ensure the gap between the developing roller 12 and the photosensitive drum 201 as a countermeasure, a further operation force of the pressing lever 233 is required and user operability is deteriorated.

For this reason, in the embodiment, the developing side electrical contact portion 120 is provided in the fixing portion 13 of the developing device 10, as described above. As described above, since the fixing portion 13 is fixed to the main assembly of the image forming apparatus 101 with a fastening member such as a screw or an engaging portion, the force F is received by the fastening member or the engaging portion via the fixing portion 13. Further, the main body of the developing device 14 is rotatably supported by the fixing portion 13 via the engaging portion 15. The engaging portion 15 is slightly loosely engaged so that the main body of the developing device 14 is capable of rotating with respect to the fixing portion 13. Therefore, the force F is not transmitted from the fixing portion 13 to the main body of the developing device 14. Therefore, in the embodiment, even in a configuration in which the developing device 10 is connected to the main assembly of the image forming apparatus 101 by the electrical contact portions, the main body of the developing device 14 is less likely to be deformed. Thus, it is possible to reduce the deformation of the developing container 11 and the instability of the contact pressure of the main body of the developing device 14 with the photosensitive member unit 20 due to the force F as described above.

Further, in the embodiment, the contact surface **120*a* of the developing side electrical contact portion 120 is a substantially parallel surface to the direction of gravity. Since the developing device 10 accommodates and agitates the toner, the toner may be scattered from a vicinity of the developing roller 12 and a vicinity of the toner replenishing port 133 during operation of the image forming apparatus 100 or when the developing device 10 is inserted or removed. And in a case that the scattered toner adheres to the developing side electrical contact portion 120, since the toner is nonconductive material, it may enter between the main body side electrical contact portion 911 and the developing side electrical contact portion 120 and may cause a conduction failure. Therefore, in the embodiment, since the contact surface 120*a* of the developing side electrical contact portion 120 is arranged substantially parallel to the direction of gravity, the scattered toner is prevented from accumulating on the developing side electrical contact portion 120**.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-195667 filed on Dec. 7, 2022, which is hereby incorporated by reference herein in its entirety.

What is claimed is:

1. A developing device mountable on an image forming apparatus, the developing device comprising:

- a main body portion including a developing container configured to accommodate a developer containing toner and a carrier, and a developer carrying member configured to carry and feed the developer to a developing position where an electrostatic image formed on an image bearing member is developed;
- a fixing portion fixed to the image forming apparatus to mount the developing device on the image forming apparatus in a state in which the main body portion is positioned in the image forming apparatus and the fixing portion is positioned in the image forming apparatus;
- a connecting portion configured to connect the main body portion and the fixing portion; and a developing side electric contact portion provided on the fixing portion and configured to contact a main assembly side electric contact portion of the image forming apparatus in a state in which the main body portion is positioned in the image forming apparatus and the fixing portion is positioned in the image forming apparatus, wherein in a case where the developing device is pressed by a pressing portion of the image forming apparatus in a state in which the fixing portion is fixed to the image forming apparatus, the main body portion is rotated about the connecting portion as a rotation center so that the developer carrying member is moved from a separated position separated from the developing position to the developing position.

2. A developing device according to claim 1, wherein the developing side electric contact portion includes a contact surface to be contacted with the main assembly side electric contact portion, and wherein the contact surface is a surface substantially parallel to a direction of gravitation.

3. A developing device according to claim 1, wherein the developer carrying member is rotatable, and wherein the developing side electric contact portion is located below a rotational axis of the developer carrying member with respect to the direction of gravitation in a state in which the fixing portion is fixed to the image forming apparatus.

4. A developing device according to claim 1, wherein the developing side electric contact portion is a contact portion to communicate with the image forming apparatus.

5. A developing device according to claim 1, wherein the main body portion further includes a toner density sensor configured to detect a toner density of the developer accommodated in the developing container, and wherein the developing side electric contact portion is a contact portion to communicate between the toner density sensor and the image forming apparatus.

6. A developing device according to claim 1, wherein the fixing portion is located upstream of the developer carrying member with respect to a mounting direction in which the developing device is mounted on the image forming apparatus.

7. A developing device according to claim 1, wherein a position where the fixing portion is positioned in the image forming apparatus is located upstream of a position where the main body portion is positioned in the image forming apparatus with respect to a mounting direction in which the developing device is mounted on the image forming apparatus.

8. A developing device according to claim 1, wherein the fixing portion is fixed to the image forming apparatus by a fastening member in a state in which the fixing portion is positioned in the image forming apparatus and the fixing portion is positioned in the image forming apparatus.

* * * * *